United States Patent Office 2,863,251
Patented Dec. 9, 1958

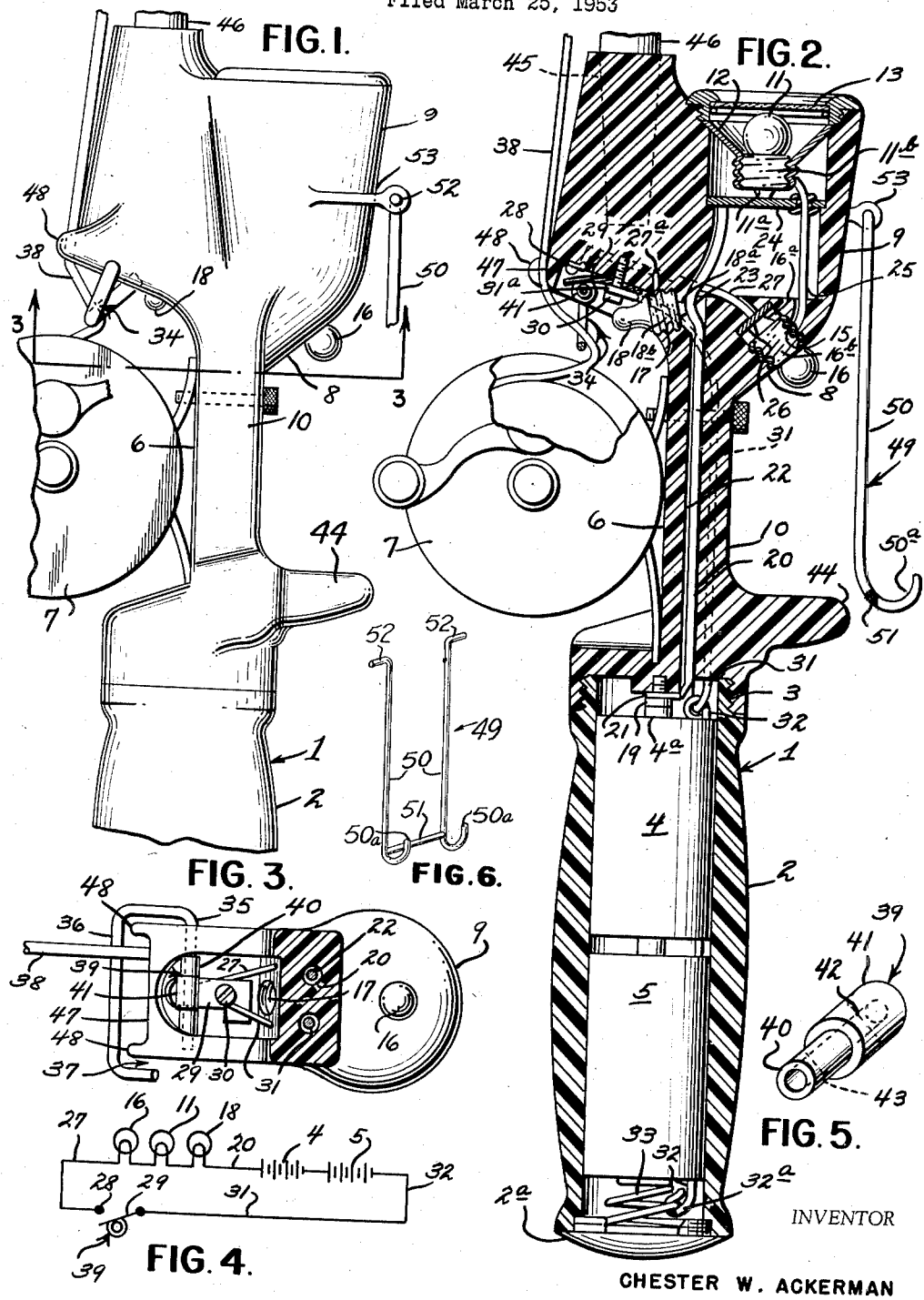

2,863,251

FISHING POLE ILLUMINATING DEVICE

Chester W. Ackerman, Mansfield, Ohio, assignor to Lloyd W. Fierbaugh, Daniel S. Webster, and William F. Rice, all of Ashland, Ohio Application March 25, 1953, Serial No. 344,537

2 Claims. (Cl. 43—17)

This invention relates to a fishing pole having novel illuminating means thereon and is a continuation-in-part of my co-pending application, Serial No. 239,427, filed on July 31, 1951, for Fishing Pole Illuminating Device.

The principal object of the present invention is to provide illuminating means for a fishing pole handle so arranged thereon that light will be projected in three directions when tension is applied to the fishing line.

Another object is the provision of a lighting device on a fishing pole handle adjacent the reel so that both the end of the pole and the handle portion thereof will be illuminated upon the application of tension to the line.

A further object is the provision of a novel fishing pole lighting device having a lighting device so mounted on the handle above the reel that the line engages with a switching means and causes the lights to be illuminated when tension is applied to the line.

Still another object is to provide a pivotally mounted bracket on the fishing pole handle adapted to support the pole in fishing position and to prevent of the same being dislodged when tension is applied to a line.

These and other objects and advantages will be apparent by referring to the accompanying drawings, wherein Figure 1 is a fragmentary side elevation of the present device, showing the relative positions of the reel, line, lighting device and pole supporting bracket;

Figure 2 is a longitudinal vertical sectional view taken through the center of Figure 1, with the reel;

Figure 3 is a section on the line 3—3 of Figure 1, showing the switch arm for the lighting device;

Figure 4 is a diagrammatic view of the wiring;

Figure 5 is a perspective view of the cam on the switch arm; and

Figure 6 is an enlarged perspective view of a bracket forming a part of the invention.

Referring more particularly to the drawings, wherein like reference characters designate similar parts throughout the several views, the numeral 1 represents a fishing pole handle including a preferably cylindrical housing 2 of suitable non-electric conductive material closed at its lower end by a removable cap 2a. The upper end is threadedly connected, as at 3, to the body of the handle. A series of batteries 4 and 5, such as conventional flash light batteries, are mounted within the housing 2 and arranged so that the terminal of the battery 5 will engage the base of the battery 4.

The handle 1 is preferably formed with a substantially U-shaped reel seat 6 upon which a reel 7 is suitably and removably mounted, as at 7, in the usual manner. Formed integrally with the upper end 8 of the handle is a cylindrical housing 9 which is axially aligned with the base 10 of the reel seat. The housings 2 and 9 and the reel seat 6 are made of suitable non-electric conductive material, such as, plastic or the like. A flash light bulb 11 and reflector 12, are mounted in the upper end of the housing 9, and are enclosed therein by a suitable removable lens 13. Projecting outwardly and angularly through an opening 15 in the rearward underside of the housing 9 is a second flash light bulb 16. Projecting outwardly and angularly through an opening 17 in the forward underside of the housing 9 is a third flash light bulb 18.

A contact 19 of electric conducting material, which may be in the form of a screw, is carried by the lower portion of the reel seat 6 and its head is in electrical contact with the terminal 4a of the battery 4. The lower end of an electrical conducting wire 20 is looped about the shank of the contact 19 and in engagement therewith as indicated at 21. From the point 21 the wire 20 extends upwardly through a suitable passageway 22 formed in the seat 6 and has a hump or bend 23 formed therein which is in electrical contact with the terminal 18a of the bulb 18. From the hump 23 the wire 20 extends upwardly through a suitable passageway in the housing 9 and into electrical engagement with a contact plate 24 which is embedded in the material of the housing 9 and which is in electrical contact with the terminal 11a of the bulb 11.

An electrical conducting wire 25 extends through a suitable passageway in the housing 9 and its opposite ends are connected to the bases 11b and 16b of the bulbs 11 and 16. The terminal 16a of the bulb 16 is in electrical contact with a contact plate 26 embedded in the material of the housing 9 and which in turn is in electrical contact with one end of an electrical conducting wire 27. The wire 27 extends through a suitable passageway in the housing 9 and has its opposite end in electrical engagement with a fixed contact 28. An electrical conducting wire 27a connects the wire 27 to the base 18b of the bulb 18. A movable contact 29 which may be in the form of a resilient strip is secured by a fastening element 30, such as a screw, to the housing 9 so that its free end is adjacent to but normally out of contact with the fixed contact 28.

An electrical conducting wire 31 has one end looped about the screw 30, as indicated at 31a, and is held at all times in electrical contact with the movable contact 29. The wire 31 extends downwardly through a suitable passageway in the reel seat 6 and its lower end projects into the housing 2 where it is electrically connected to the upper end of an electrical wire 32. The wire 32 extends downwardly between the inner wall of the housing 2 and the batteries 4 and 5 and has its lower end electrically connected, as at 32a, to a coil spring 33, the base of which seats in the cap 2a. The upper end convolution of the spring is in electrical contact with the base of the battery 5. The spring 33 resiliently urges the terminal of the battery 5 into contact with the base of the battery 4 and the terminal 4a of the battery 4 into contact with the head of the screw 19.

The movable contact 29 may be moved into engagement with the fixed contact 28 to close the circuit to the three bulbs by a switch member, generally indicated at 34. The latter consists of a shaft 35 rotatably extending through the rear end of the housing 9. Formed on the shaft 35 is a substantially U-shaped line engaging arm 36 which is open at one end, as at 37. As the arm 36 is spaced from the rear of housing 9, the line 38 from the reel may be slipped over end 37 thereof so as to move thereunder when being reeled during fishing. A cam member, generally indicated at 39, is mounted on the shaft 35 for rotation therewith and comprises a boss 40 and a cam 41 having a high substantially semi-circular portion 42 and a low flat portion 43.

Thus, when tension is applied to the line 38, by a fish or the like, the arm 36 is moved upwardly in a clockwise direction, viewing Figure 1, causing the shaft 35 and cam member 39 to rotate to bring the high portion 42 of the cam member into engagement with the movable contact 29. This movement of the cam member will cause the movable contact 29 to engage the fixed contact 28 and close the circuit so that the bulbs 11, 16 and 18 are connected with the batteries and caused to be illuminated. The handle is provided with an arcuate finger grip 44 to facilitate convenient handling of the rod, which is usually handled with the reel 7 uppermost in the Figure 1 position.

A socket 45 for receiving the first fish rod section 46 is formed in the upper end of the housing 9 adjacent to the bulb 11 so that the bulb 11 will project its rays outwardly parallel to the rod and fishing line to illuminate the same. On the other hand, as the bulb 16 extends downwardly and rearwardly at an angle from the housing 9, the latter will cast its rays downwardly for general illumination purposes and the rays from bulb 18 will illuminate the reel.

When desired, the switch member 34 may be manually operated to close and open the switch.

The top of the bulb housing 9 is preferably flattened and widened at the rear end thereof, as at 47, to provide an even surface over which the line passes and flanges 48 on the sides of this surface serve to prevent the line from slipping therefrom.

A substantially U-shaped rod supporting bracket 49 consisting of a pair of spaced converging legs 50 joined at their lower ends by a cross piece 51 is pivotally and removably connected to the rod handle. The lower ends 50a of the legs 50 are curved upwardly and forwardly so as to provide a hooked portion for a purpose to be hereinafter described. The upper ends of the legs 50 are bent outwardly, as at 52, which ends are adapted to extend through a pair of downwardly extending spaced ears 53 formed on the bulb housing 9 at a point adjacent the bulb 16. As the bracket is of resilient metal, it follows that the legs may be disassembled from the ears 53 by pressing the legs slightly together. When it is desired to prop the rod upwardly at an angle in fishing position, the bracket may be assembled on the handle and arranged downwardly at an angle so as to engage the ground or other surface. If undue pressure is applied to the line so as to pull the same, it follows that the curved or hooked lower end of the bracket will have a tendency to engage with some object and prevent the rod from being lost.

It will be noted that the lens 13 will protect the bulb 11, that the legs 50 of the bracket 49 straddle the bulb 16 to afford protection thereto against being accidently struck by some object and that the switch member 34 protects the bulb 18.

While I have shown and described a preferred form of my novel fishing rod handle illuminating and supporting device, it is to be understood that various changes and improvements may be made without departing from the scope and spirit of the appended claims.

What I claim is:

1. A fishing rod handle comprising a handle portion, a head portion, said portions being recessed on one side to provide a substantially U-shaped reel seal, a reel received by said recess, a lamp on said head portion extending into and disposed wholly within the confines of said recess inwardly of said reel for illuminating said reel, said portions being recessed on the opposite side to provide a second substantially U-shaped recess, a second lamp on said head portion extending into and disposed wholly within said second recess, said head portion having a hollow part, a third lamp disposed wholly within said hollow part, means for lighting said lamps, the outer part of said second recess being defined by said head portion, the inner part of said second recess being defined by a finger grip on the handle portion, and a supporting bracket movably mounted on said head portion and extending over said second recess and said second lamp to protect the second lamp.

2. A fishing rod handle having a recess in one side thereof, a reel mounted in said recess, a pair of guide flanges formed in said handle adjacent said recess, a fish line extending from said reel through said guide flanges, electrical illuminating means mounted in said handle and including an electrical circuit, and a switch for said circuit carried by said handle, said switch comprising a fixed contact, a movable contact, a shaft rotatably mounted in said handle, a cam affixed to said shaft in abutting relation to said movable contact, a U-shaped arm having one leg thereof affixed to one end of said shaft, having its other leg foreshortened and free-ended, and having its bight portion extending transversely in said recess normally inwardly of a line extending tangentially from said reel through said guide flanges, said arm encompassing said fish line between said reel and guide flanges whereby a tightening of said fish line acts to rotate said cam and actuate said switch.

References Cited in the file of this patent

UNITED STATES PATENTS

| | | |
|---|---|---|
| 1,010,864 | Coleman | Dec. 5, 1911 |
| 1,220,617 | Evans | Mar. 27, 1917 |
| 1,267,248 | Monighan | May 21, 1918 |
| 1,337,292 | Timmons | Apr. 20, 1920 |
| 2,195,692 | Bushey | Apr. 2, 1940 |
| 2,196,784 | Simmons et al. | Apr. 9, 1940 |
| 2,409,988 | Schwebs | Oct. 22, 1946 |
| 2,479,055 | Baur | Aug. 16, 1949 |
| 2,483,071 | Stine | Sept. 27, 1949 |
| 2,503,862 | Allgeyer | Apr. 11, 1950 |
| 2,564,625 | Jackson et al. | Aug. 14, 1951 |
| 2,579,087 | Organ | Dec. 18, 1951 |
| 2,646,641 | George | July 28, 1953 |
| 2,698,725 | Triplett | Jan. 4, 1955 |